(12) United States Patent
Southworth (10) Patent No.: US 8,340,504 B2
(45) Date of Patent: Dec. 25, 2012

(54) ENTERTAINMENT DEVICE AND METHOD

(75) Inventor: James Thomas Southworth, London (GB)

(73) Assignee: Sony Computer Entertainment Europe Limited (GB)

( * ) Notice: Subject to any disclaimer, the term of this patent is extended or adjusted under 35 U.S.C. 154(b) by 70 days.

(21) Appl. No.: 13/094,002

(22) Filed: Apr. 26, 2011

(65) Prior Publication Data

US 2012/0275755 A1 Nov. 1, 2012

(51) Int. Cl.
*G11B 27/00* (2006.01)
*H04N 5/93* (2006.01)
*G06K 9/62* (2006.01)
*G06K 9/36* (2006.01)
*G06K 9/20* (2006.01)
*H04N 9/80* (2006.01)
*G06K 9/00* (2006.01)

(52) U.S. Cl. ...................................................... 386/280

(58) Field of Classification Search .................. 382/151, 382/216, 291, 293, 295; 386/239, 241, 248, 386/278, 280
See application file for complete search history.

(56) References Cited

U.S. PATENT DOCUMENTS

| | | | | |
|---|---|---|---|---|
| 5,581,629 A * | 12/1996 | Hanna et al. | | 382/103 |
| 6,621,939 B1 * | 9/2003 | Negishi et al. | | 382/291 |
| 7,102,615 B2 * | 9/2006 | Marks | | 345/156 |
| 7,929,730 B2 * | 4/2011 | Huang et al. | | 382/103 |
| 8,081,870 B2 * | 12/2011 | Ito et al. | | 386/278 |
| 8,160,302 B2 * | 4/2012 | Wagg | | 382/107 |
| 2002/0136455 A1 * | 9/2002 | Lin et al. | | 382/173 |
| 2002/0181741 A1 * | 12/2002 | Masukura et al. | | 382/103 |

* cited by examiner

*Primary Examiner* — Daquan Zhao
(74) *Attorney, Agent, or Firm* — Lerner, David, Littenberg, Krumholz & Mentlik, LLP (57) ABSTRACT

An entertainment device for generating augmented reality environments comprises an input for a captured video signal, an image analyser to detect a predetermined marker object location within the captured video signal, a graphics generator to generate a graphics object for integration with the video signal at a selected position to generate an augmented reality image, a controller to positionally couple the graphics object to the detected marker object location within the captured video signal, and a detection failure logic to signal when the image analyser cannot adequately detect the marker object's location within the captured signal. If the logic signals the image analyser cannot detect the location of the marker object within the captured video signal, then the controller positionally decouples the graphics object from the last detected location of the marker object within the video signal, and instructs the graphics generator to modify a characteristic of the graphics object.

17 Claims, 5 Drawing Sheets

ENTERTAINMENT DEVICE AND METHOD

BACKGROUND OF THE INVENTION

1. Field of the Invention

The present invention relates to an entertainment device and method.

2. Description of the Prior Art

Recently, there has been an increase in the popularity of augmented reality applications. Augmented reality applications typically combine a captured video input with a graphical or text overlay generated by a computing device, to create an augmented view of the captured video.

Typically the additional content that is combined with the captured video is correlated with the video in some fashion; for example by using a GPS signal and compass, the computing device can calculate what objects or destinations are likely to be in the captured video's field of view and provide directions or relevant information about these.

Alternatively, so-called fiduciary markers may be included in the real-world environment that can be detected by the device in the captured video. These markers can then be used as reference points for adding graphical embellishments to the captured video. Examples of augmented reality schemes that use such markers are found in the games Eye of Judgement® and Eye Pet®.

The advent of more powerful portable computing devices, such as the so-called Sony® Playstation Portable® (PSP) or the so-called Sony® Next Generation Portable® (NGP) also make augmented reality applications possible on hand-held devices. However, this can introduce new problems for augmented reality systems, as the camera viewpoint is no longer likely to be steady or fixed.

The present invention seeks to mitigate such a problem.

SUMMARY OF THE INVENTION

In a first aspect, An entertainment device for generating augmented reality environments comprises an input for a captured video signal, an image analyser arranged to detect a location of a predetermined marker object within said captured video signal, a graphics generator arranged to generate a graphics object for integration with the captured video signal at a selected position, to generate an augmented reality image, a controller arranged to positionally couple the graphics object to the detected location of said predetermined marker object within said captured video signal, and a detection failure logic arranged to signal when the image analyser cannot detect the location of said predetermined marker object within said captured video signal; and if the detection failure logic signals that the image analyser cannot adequately detect the location of said predetermined marker object within said captured video signal, then the controller is arranged to positionally decouple said graphics object from the last detected location of said predetermined marker object within said captured video signal, and the controller is arranged to instruct the graphics generator to modify a characteristic of the of the graphics object.

In another aspect, a failsafe method for an entertainment device comprises the steps of receiving a captured video signal, detecting a location of a predetermined marker object within said captured video signal, generating a graphics object for integration with the captured video signal at a selected position to generate an augmented reality image, positionally coupling the graphics object to the detected location of said predetermined marker object within said captured video signal, signalling a detection failure if the location of said predetermined marker object within said captured video signal cannot be adequately detected, and if so signalled, positionally decoupling said graphics object from the last detected location of said predetermined marker object within said captured video signal and modifying a characteristic of the of the graphics object.

Further respective aspects and features of the invention are defined in the appended claims.

BRIEF DESCRIPTION OF THE DRAWINGS

The above and other objects, features and advantages of the invention will be apparent from the following detailed description of illustrative embodiments which is to be read in connection with the accompanying drawings, in which.

DESCRIPTION OF THE PREFERRED EMBODIMENTS

An entertainment device and method are disclosed. In the following description, a number of specific details are presented in order to provide a thorough understanding of the embodiments of the present invention. It will be apparent, however, to a person skilled in the art that these specific details need not be employed to practise the present invention. Conversely, specific details known to the person skilled in the art are omitted for the purposes of clarity where appropriate.

Figure 1A:
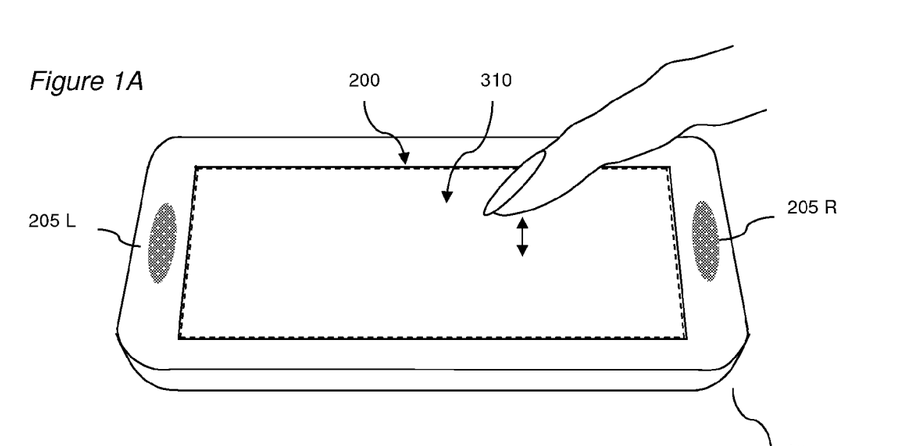
FIGS. 1A and 1B are schematic diagrams of a portable device in accordance with an embodiment of the present invention.
Figure 1B:
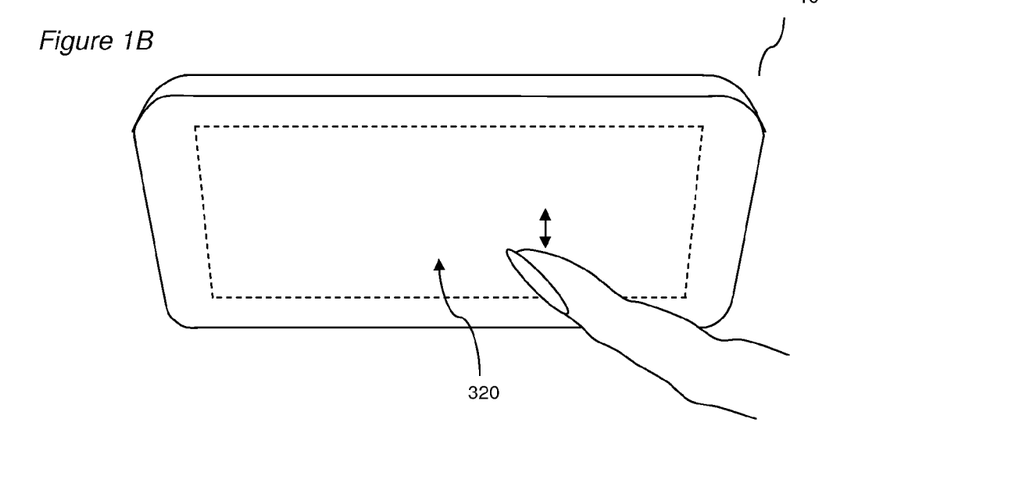

FIGS. 1A and 1B illustrate an embodiment of a portable electronic device (PED) 10 such as the NGP. FIG. 1A shows a notional front or top face of the PED, whilst FIG. 1B shows a notional rear or bottom side of the PED. The front and rear faces are substantially parallel to one another.

On the front face, the PED comprises a display 200 and optionally one or more loudspeakers 205L, 205R.

On the rear side, the PED comprises a rear touch sensitive surface 320 (indicated by the dotted lines) having similar dimensions to the display 200. The rear touch sensitive surface is positioned so as to be substantially aligned with the display. That is to say, considered in a direction normal to the plane of the display, the rear touch sensitive surface substantially overlies the display.

A transparent front touch sensitive surface 310 (indicated by the dotted lines in FIG. 1A) can also be provided coincident with the display 200. The front and rear touch sensitive surfaces and the display thus have similar dimensions and placements on their respective faces of the device. The touch sensitive surfaces also have a similar resolution of touch localisation.

Figure 2:
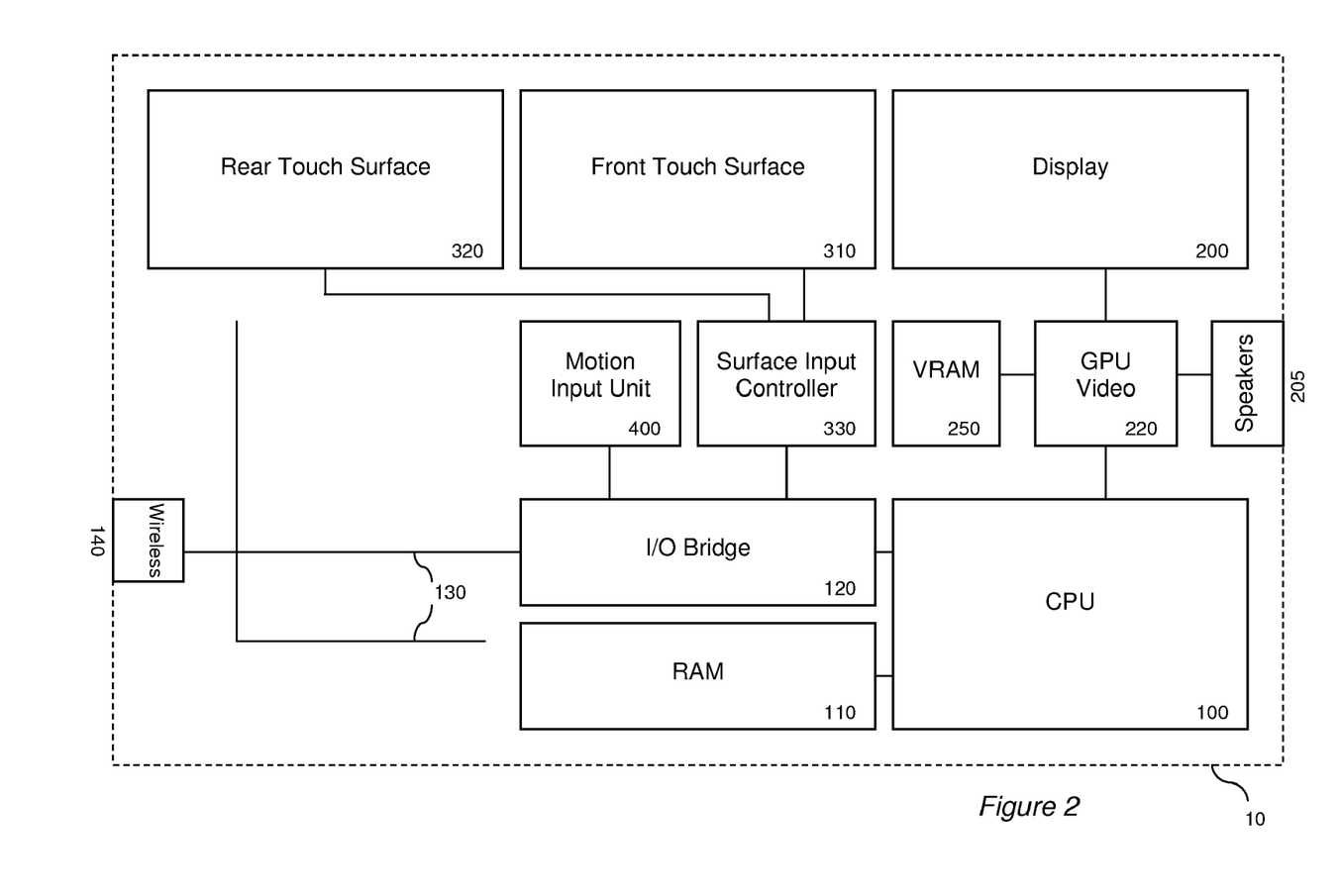
FIG. 2 is a schematic diagram of a portable device in accordance with an embodiment of the present invention.

Referring now to FIG. 2, an embodiment of the PED comprises a central processor (CPU) 100 coupled to random access memory (RAM) 110, and optionally to a read only memory (not shown). In addition the CPU communicates with a graphics processing unit (GPU) 220. The GPU has access to video RAM (VRAM) 250. The GPU outputs audio to loudspeakers 205LR (only one shown for clarity) and/or to a headphone jack socket (not shown). The GPU also outputs video information to the display 200. The display is typically a liquid crystal display (LCD) but may be an organic light emitting diode display (OLED) or similar suitable display technology.

In addition, the CPU communicates with an input/output bridge (I/O bridge) 120 that co-ordinates communication with peripheral components both integral to and linkable with the PED. In an embodiment of the PED the I/O bridge communicates with a surface input controller 330, which parses inputs from the rear touch sensitive surface 320 and optionally the transparent front touch sensitive surface 310. The I/O bridge also communicates with an optional motion input unit 400 comprising one or more micro electromechanical (MEMs) accelerometers and/or gyroscopes, to provide up to six axes of motion input (x, y and z axis lateral movement and roll, pitch and yaw rotational movement). The I/O bridge also communicates with a bus 130, upon which various peripheral devices may be linked, including one or more wireless communication units 140, such as for example WiFi and/or Bluetooth® communication units.

It will be appreciated that the CPU 100 may be a single core or multi core processor. Similarly, the RAM may be dynamic RAM or may comprise both dynamic RAM and static (e.g. flash) RAM units. Likewise, whilst the GPU typically uses dedicated VRAM, alternatively or in addition it may share common RAM with the CPU. Finally, it will be appreciated that the function of the surface input controller 330 may be performed by the CPU itself.

The rear touch sensitive surface may be a conventional capacitance touchpad or panel such as that found in laptop computers or portable telephones. Such a touchpad typically comprises two layers of parallel conductive lines separated by an insulator and arranged at right angles to one another. A high frequency signal is swept through every respective pairing of lines between the two layers. The measurable current for each pair is then proportional to the capacitance at their point of intersection. When a user's finger is placed at or near that intersection, however, some of the electrical field between layers is shunted to ground, changing the effective capacitance and hence the measured current. Precise localisation of the user's finger can be achieved by measuring changes in capacitance at nearby points of intersection, which will be proportional to their respective distances from the finger. So-called multi-touch operation of the touchpad can be achieved by detecting distinct peaks in capacitance change at separate intersection points on the pad. Meanwhile, movement of a user's finger or fingers can be estimated from successive points of intersection where contact is detected.

A front touch sensitive surface for use with the display operates in a similar manner to the rear touch sensitive surface, but in this instance the conductive lines are typically transparent (as a non limiting example, being formed by a deposition of indium tin oxide), and the insulator between two layers is provided by all or part of the display window (e.g. a glass layer); typically a further transparent protective layer is then provided on top of the upper conductive layer.

It will be appreciated however that any suitable touch sensitive technique may be used for either touch panel.

It will also be appreciated that whilst not shown in the Figures for the purposes of clarity, the PED comprises power distribution lines to various components and one or more sources of power, such as an input socket (for example a conventional DC power socket, or alternatively or in addition a USB socket). Such an input socket may also be used to charge one or more batteries (also not shown). Such batteries may be user removable or may be sealed in the device. Other components not shown include, for example, an optional microphone.

Figure 3:
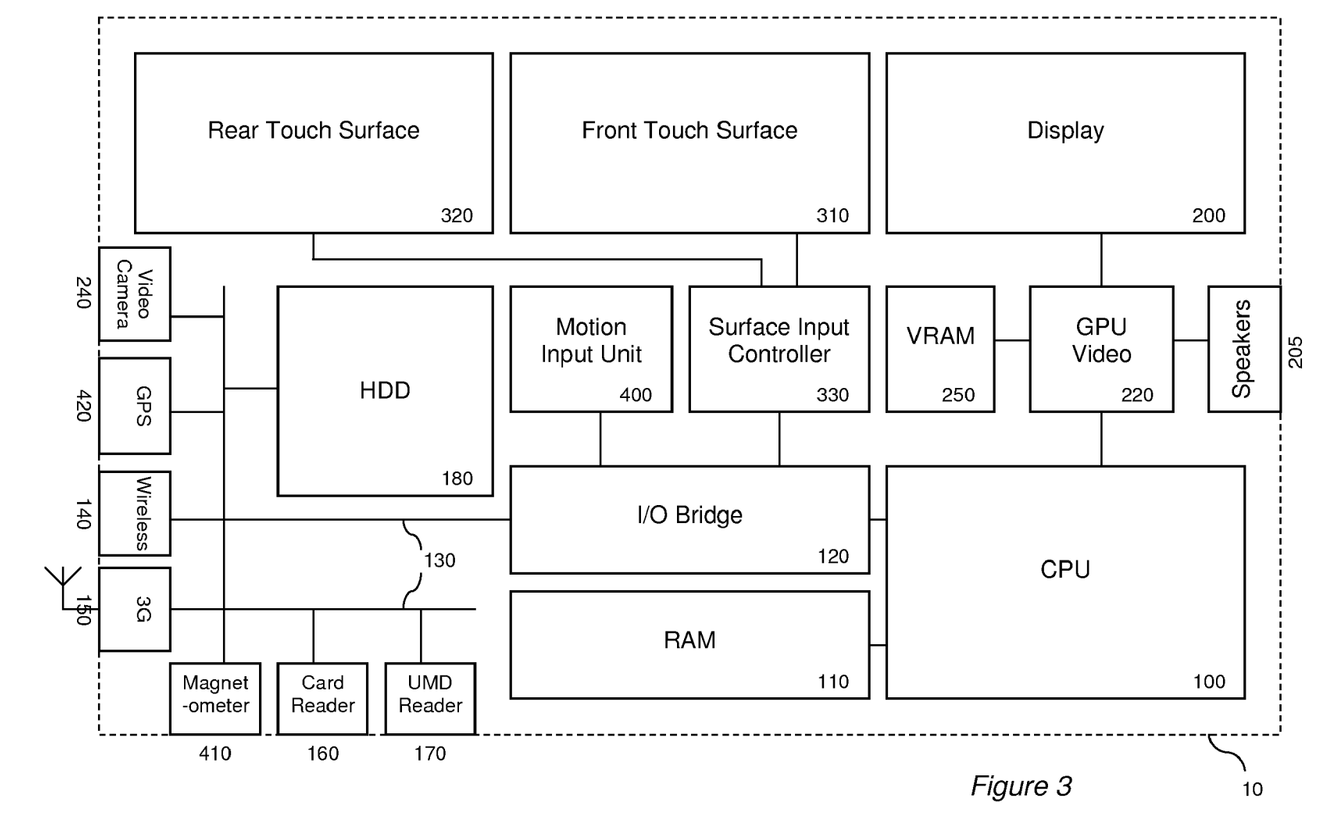
FIG. 3 is a schematic diagram of a portable device in accordance with an embodiment of the present invention.

Referring now also to FIG. 3, an embodiment of the PED may comprise one or more additional components, either integrated within the device or connectable to it. The additional components include, but are not limited to, the following.

a) A card reader 160 suitable for reading from and optionally writing to memory cards, such as a Sony® Memory Stick® card, or alternatively legacy memory cards such as those used by the Sony® Playstation 2® entertainment device. Such a reader may be integral to the PED or may connect to the bus 130 via a USB connection.

b) A universal media disk (UMD) reader 170 or other optical disk reader (such as a DVD or Blu-Ray® disk reader), for accessing media and/or game content stored thereon. Such a reader may be removably connectable to the bus 130 via a USB or proprietary connection.

c) A magnetometer 410 for determining compass direction (i.e. the current absolute orientation of the PED), mounted integral to the PED either on the bus 130 or as part of the motion input unit 400.

d) A third generation (3G) or other mobile telephony module 150. in an embodiment, the module and aerial are integral to the PED, and optionally the aerial is shared with or otherwise coupled electromagnetically with other wireless units in the device for the purpose of transmission and reception. Alternatively the module may be removably connectable to the PED, for example via USB port or a Personal Computer Memory Card International Association (PCMCIA) slot.

e) A hard disk drive (HDD) 180 integral to the PED, providing bulk storage for audio/video media, downloaded games, and the like.

f) A GPS receiver 420. Again the GPS receiver may share an aerial with one or more other wireless units (such as WiFi) within the PED or may use its own aerial. Map information, where used, may be stored locally at the receiver, or in flash RAM of the PED, or on an HDD of the PED.

g) A video camera 240, typically comprising a charge coupled device (CCD) optical sensor and suitable optics for imaging onto the CCD. The resolution of the CCD may for example be 640×480 pixels, but may be any suitable resolution, such as for example 1920×1080 pixels (full HD). In an embodiment the video camera is integral to the PED, but alternatively may be removably connectable to the bus 130 via a USB or proprietary connection. An embodiment of the PED comprises two such video cameras 240, forming a stereoscopic pair.

In operation, the CPU accesses an operating system that is resident for example on a ROM, flash RAM or a hard disk. The operating system co-ordinates operation of the various functions of the PED and presents a user interface to a user of the device. The user interface will typically comprise graphical outputs via the display and touch based inputs, but may also include audio outputs and/or motion-based inputs.

The touch based inputs to the PED of the above embodiments are peculiar to the arrangement of a display on the front of the PED and a correspondingly positioned touch sensitive surface (or 'panel') on the rear of the PED. This allows the user to treat the rear panel as a proxy for the display (in other words, address actions and inputs to the rear touch panel as if to the display, and/or point to the rear panel in order to point to the display). Thus for example, the user can point to icons or other displayed features from apparently underneath the display by touching the rear touch panel at the corresponding position.

It will be appreciated that unlike a laptop touch panel, the rear touch panel has a substantially 1:1 scale relationship with the screen, thereby not just enabling motion of a mouse pointer on screen that corresponds to motion of touch on the panel (for example), but furthermore also enabling direct placement of such a mouse on the screen at the position corresponding to the touch on the panel, because as noted above the panel can be understood to represent the screen (i.e. act as a proxy).

Use of the rear touch panel as a proxy for the display advantageously allows interaction with the graphical output of the device without the user's hand or fingers obscuring the display or marking the display window.

In addition, the subjective experience of controlling the displayed interface from behind or underneath the screen allows for new modes of user interaction; for example selection, highlighting or magnification of a screen element may be achieved by a user pushing the element 'toward' them (i.e. with finger pressure on the rear panel) from behind the device. For a capacitance based touch panel, an increase in pressure on the rear panel (i.e. a push) can be detected by a flattening of the user's finger, which results in a larger covered area and hence more points of intersection in the panel having reduced capacitance. Conversely a reduction in pressure reduces the number of intersection points where touch is detected.

In conjunction with a similar but transparent front touch sensitive surface overlaid on the display, further modes of interaction become possible. For example, objects may be selected by being pinched between thumb and forefinger, with the thumb and forefinger touching the front and back touch panels respectively. The object may then be moved around, and, for example, activated by using a squeezing action between thumb and forefinger.

Further modes of interaction rely on the correspondence between position and/or motion of the user's fingers on the two touch panels. For example in a video playback application, stroking a finger across only the top touch panel may be interpreted as a fast-forward or rewind command (depending on direction), whilst a pinch hold followed by corresponding movement left or right of both fingers may be interpreted as selection of a specific point in playback (i.e. where the total playback time is scaled to the width of the touch panels). By contrast, however, a pinch hold followed by both fingers moving in opposite directions to each other may be interpreted as a twisting action, and adjusts a virtual volume dial. A similar grammar of interaction could be used for example for document or e-book navigation, with scrolling, page selection and zoom replacing the above playback functions.

It will be appreciated that the above embodiment of a PED is non-limiting, and any suitable portable electronic device may be envisaged, including but not limited to the NGP and PSP and other portable gaming devices, smart-phones, personal digital assistants and personal media devices, if they comprise or are connectable to a video camera and have suitable processor and display capabilities.

In an embodiment of the present invention, the PED comprises or is attachable to a camera 240. Hence the PED comprises an input for a captured video signal, the signal being obtained either from an integral or connected camera. The camera is either rear-facing (i.e. mounted on the opposite side of the device to the display) or can be swivelled to be rear facing. That is to say, the camera faces in the opposite direction to the display.

Optionally the camera has a field of view sufficient to encompass the field of view that might be perceived by a user looking through an aperture in the device equivalent in size and position to the display. Where the camera is in a fixed relation to the display (i.e. built-in to the device or affixed to a predetermined mount), then a predetermined offset and scaling of the captured image may be performed to generate the field of view equivalent to looking through a transparent window equivalent in size, position and orientation to the display of the PED. Otherwise, the user may follow a calibration process to achieve the effect.

In this case, the subjective effect on the user is that the PED has a transparent window through which the user's environment can be seen—but which can also be augmented by graphical embellishments, as detailed herein.

Augmentation of the user's environment may be enabled by placing a predetermined marker object such as a fiduciary marker within the user's environment. When the user looks at the environment with the PED, this marker is included in the captured video.

Figure 4:
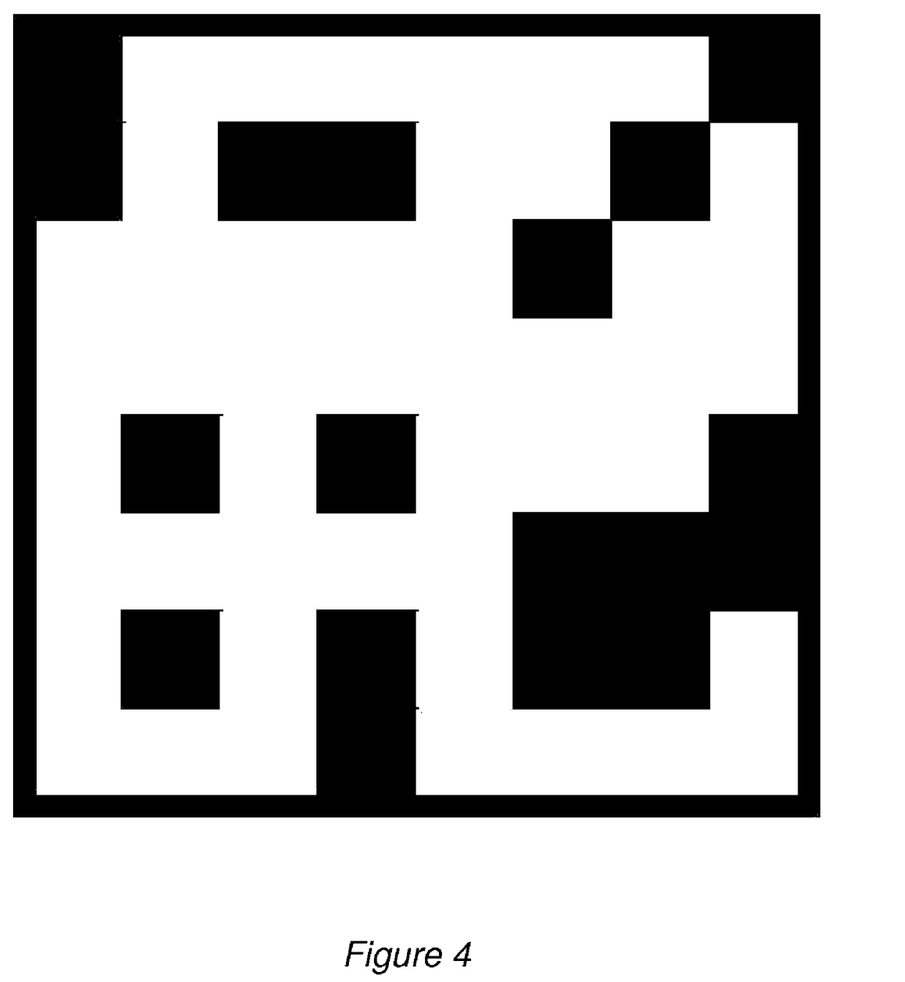
FIG. 4 is a schematic diagram of a fiduciary marker in accordance with an embodiment of the present invention.

The PED's CPU may then operate as an image analyser arranged to detect a location of the predetermined marker object within said captured video signal. An example of such a marker is shown in FIG. 4. Typically, the marker is a high-contrast marker with no axis of symmetry, in order to simplify detection of the marker in the video image and to disambiguate its orientation. Upon detection of the marker using known image detection techniques, the marker's x and y co-ordinates within the captured image can be readily obtained. The marker's orientation in terms of roll, pitch and yaw relative to the device can then be estimated using known techniques by comparing the distortion of the captured image of the marker to a reference image stored in the device. Similarly the distance (or z co-ordinate) of the marker from the device can be estimated from the size of the marker in the captured image in conjunction with details of the resolution of the camera and, if applicable, details of any zoom setting or other magnification by the camera. Hence values for potentially up to six axes (x, y, z, roll, pitch and yaw) can be estimated for the marker. Using this information, the position, distance and relative angle of the marker to the device can be estimated, and hence, implicitly, the position, distance and relative angle of the surface upon which the marker rests.

This enables the generation of graphical embellishments that are visually consistent with that surface and with the position of the marker in the captured image.

Consequently the GPU, either alone or in conjunction with the CPU, can operate as a graphics generator in order to generate a graphics object for integration with the captured video signal at a selected position, to generate an augmented reality image.

In order to select a position for a graphics object (for example an EyePet character, or a toy that the EyePet character may interact with), the CPU acts as a controller arranged to positionally couple the graphics object to the detected location of the marker within the captured video signal.

Thus for example, the graphics object may be positioned directly over the marker within the captured video image, so wholly or partially obscuring the marker in the displayed augmented reality image. Consequently when the device (or the marker) are moved, the graphics object tracks the relative position of the marker in the captured video.

Such positional coupling may also be at a consistent offset relative to the marker; for example four graphical beacons may be positioned at distances around the marker to denote a play area for a game.

Consequently such positional coupling may also constitute a bounding box for a graphical object; for example a mobile graphical object (such as a graphical character under the control of a user, or a graphical character under the control of a game) may move according to such control within a boundary that is set relative to the marker.

Such a boundary may be arbitrary (i.e. determined by game parameters) or derived as a function of the captured video images. For example, the boundary may be responsive to a region around the marker having less than a threshold deviation in colour with respect to the colour near to the marker; this region can be assumed to indicate real-world boundaries such as the extent of a table or rug upon which the marker has been placed.

In this way, for example, an EyePet may variously walk around the displayed image on top of a fiduciary marker, or may follow such a marker as if chasing it or being led on a leash, or roam within a boundary relative to the marker. Due to the detected position, orientation and scale of the marker and hence the implied position distance and orientation of the surface it lays upon, the EyePet can also be rendered to be consistent with that surface, providing a pleasing illusion that the EyePet is properly integrated within the real environment.

However, a problem with PEDs such as the PSP and NGP is that the camera view can be easily moved so as to no longer encompass a view of a particular marker in the resulting captured video image. In this case, where the augmented reality system relies at least in part on position, scale and/or orientation data estimated from such a marker, it becomes difficult to maintain the illusion that a graphical object overlaid on the captured video image is integrated properly within the environment.

Consequently, in an embodiment of the present invention, the CPU operates as a detection failure logic arranged to signal when the image analyser cannot adequately detect the location of said predetermined marker object within said captured video signal.

One or more detection outcomes may qualify as a failure, including but not limited to:
- if the image analyser cannot detect a marker, or
- if the image analyser cannot locate or otherwise estimate a required property of the marker to a threshold level of accuracy or confidence, or
- if the image analyser detects several markers, resulting in ambiguity regarding which one a graphical object should be associated with, or
- if the image analyser performs predictive tracking (such as with a Kalman filter), in the case where the detected location of the marker deviates from a predicted position by a threshold amount.

Other types of failure relevant to various augmented reality applications will be apparent to the skilled person.

Hence, for example, when the image analyser cannot detect a marker in the captured video image, the detection failure logic sets a flag in a register or provides some other suitable signal within the PED to indicate that detection of a marker has failed.

Consequently, if the detection failure logic signals that the image analyser cannot adequately detect the location of the marker within the captured video signal, then the controller is arranged to positionally decouple the graphics object from the last detected location of the predetermined marker object within the captured video signal. Moreover, the controller is also arranged to instruct the graphics generator to modify a characteristic of the of the graphics object.

Thus, for example, where an EyePet is positionally coupled to a marker and is either tracking, following or bounded relative to the marker, if the user then either moves the marker out of view or moves the device away from the marker, the controller switches to a failsafe mode for the EyePet in which it positionally decouples the EyePet from the marker (for example from the last known or estimated position of the marker) and also correspondingly modifies some characteristic of the EyePet's appearance and/or behaviour.

In the absence of a detected marker to positionally couple with, this failsafe mode should be operable without clear reference to the topology of the real environment. Thus for example, the EyePet may be enclosed in a bubble, or float with a balloon, or roll in a ball, or adopt some other change in characteristic that reduces the need to visually integrate the EyePet within the environment in a convincing manner (i.e. without the need for one or more of an appropriate position, scale and/or orientation with respect to a surface in the environment). The EyePet can then remain on screen and continue to engage with the user until the marker (or a new marker) is detected and the position, scale and orientation of a surface can be re-established.

Such changes in the characteristic of the graphics object typically combine a graphical change and a behavioural change. The graphical change provides a cue to the user that the object (for example again the EyePet) has become positionally decoupled from the marker, and may also provide a visual rationale for an accompanying change in behaviour.

Hence, for example, being encased in a bubble or holding a floating balloon provides a rationale for the EyePet now moving on the screen in a manner uncorrelated with the background environment in the video.

A similar change in characteristics may be for the EyePet to dive into a hole superposed on the video image that closes after it so that it effectively disappears from the screen. In this case, the EyePet may become more noisy or vocal, and/or a reticule or other indicator of its supposed position may be displayed over the captured video. Again in this way the need for the graphical object to be displayed in a manner consistent with the position, scale and/or orientation of a surface in the captured video is reduced or eliminated whilst maintaining the illusion that the EyePet is still integrated within that environment.

However, it will be appreciated that for certain games or applications or for certain graphical objects it would be appropriate to apply only a graphical change in characteristic, or conversely only a behavioural change in characteristic, in accordance with a designer's preferences. For example, if the graphical object was a bird, then the bird may simply change its behaviour (i.e. fly) during failsafe mode.

Finally, it will be appreciated that graphical objects that are not normally positionally coupled to a marker need not change appearance or behaviour during failsafe mode, unless desired by the designer of the game or application.

It will be appreciated that it is preferable to avoid unnecessarily entering the failsafe mode, in order to maintain normal game-play or application use where possible.

Hence, in an embodiment of the present invention, a predetermined threshold period of time must elapse during which the detection failure logic signals failure, before the controller moves the PED into the failsafe mode.

This allows for brief instances of marker detection failure by the image analyser even when the marker is visibly present in the captured video image. Such failures may occur due to adverse lighting (e.g. a reflection on the marker), or a partial occlusion of the marker, or a distance or relative angle to the marker that makes reliable detection of it difficult.

The threshold period may be measured in terms of captured video frames. Example threshold periods may therefore for example lie in the range 2 to 25 frames, but may be more depending on the actual acquisition frame rate of the video camera or, if different, the analysis frame rate of the image analyser.

Similarly, alternatively or in addition in an embodiment of the present invention the PED comprises a motion detector.

In this embodiment, the controller is arranged to only positionally decouple the graphics object from the last known position of the marker and instruct the graphics generator to modify a characteristic of the graphics object if in conjunction with a failure signal from the detection failure logic, the motion detector detects motion in the plane of the captured video signal exceeding a predetermined threshold.

Hence if there is no significant movement of the PED in this plane then any loss of the marker is likely to be due to a failure of the image analyser rather than because the marker is no longer in the captured image. In this case it may be preferable to assume that the marker remains at its last known position and that the current values of position, distance and orientation for the marker and underlying surface remain valid. In this case, the failsafe mode is not entered and the graphics object can continue to use its normal operating characteristics.

Optionally, after a threshold period (typically longer than the predetermined threshold period described above, due to the higher confidence of detection failure), the controller may then enter failsafe mode and decouple the graphics object and modify its characteristics as described previously.

Hence where a lack of movement suggests that the loss of a marker is due to a detection or recognition error, a longer grace period for recognition recovery may be provided before the controller switches to the failsafe mode of decoupling the graphics object and modifying its characteristics.

In an embodiment of the present invention, the motion detector comprises an accelerometer, such as may be found in motion input unit 400 described above, potentially acting in co-operation with the CPU.

Alternatively or in addition, the motion detector comprises an optical flow detector. For example, the CPU, GPU or a combination of these may operate as an optical flow detector using known techniques to detect the gross direction of movement of successive captured video images. Typically these are expressed as whole-image motion vectors, for example based on a spatial correlation between successive captured video images, although any suitable optical flow technique may be considered.

In the case of either motion detector, it will also be appreciated that the predetermined threshold of movement may be dependent upon the last known position of the marker within the captured video. Thus, for example, if the marker was last detected in the centre of the video image, a relatively large threshold of motion may be permitted whilst still assuming that the failure to detect the marker is due to an image analyser failure rather than due to the marker no longer being present in the captured images.

By contrast if the marker was last detected close to one edge of a video image, then motion in a direction away from that edge would use a much smaller threshold than motion towards it. Hence in practice the threshold may comprise four sub-thresholds, one for each edge of the video image.

More generally, therefore, the predetermined threshold represents a motion sufficient to move the marker from its last detected location to a location with respect to the captured video image where the image analyser is incapable of detecting the location of the marker.

Notably the image analyser may become incapable of detecting the location of the marker before the whole of the marker disappears from a video image; consequently, the threshold level of motion may also depend on the last known size of the marker in the captured images.

In an embodiment of the present invention, the motion of the PED as detected by the accelerometers and/or gyroscopes, and/or by optical flow analysis, can be used to estimate the current topology of the environment in the captured video.

By tracking the movement of the PED after the loss of the marker, the last known relative orientation and distance of the surface can be approximately updated by adding the subsequent tracked changes in orientation and position of the PED. Given this information, the graphical object can continue to be integrated within the augmented reality image as described previously.

However, this is not a long-term solution since over time the environment in the captured video images may change to such an extent that if the graphical object (such as the EyePet) continued to operate normally, the illusion that it is integrated with the environment is likely to be lost. Consequently again in an embodiment of the present invention, the PED may enter the failsafe mode after a further predetermined threshold period, or alternatively or in addition based upon some parametric change in the captured images; for example, a threshold percentage change in the composition of a colour histogram of successive video images may indicate when the captured environment has changed to an unacceptable extent, triggering entry into the failsafe mode.

Notably, by tracking the motion of the PED, in an embodiment of the present invention the motion detector is operable to predict the location of the marker in the captured video signal.

In a first instance, this may be used to modify parameters of the image analyser to increase detection sensitivity (or similarly lower or relax a rejection threshold, if used) in an area of the captured video where the marker is expected to be based upon its last known position and the cumulative movements of the PED in the meantime. This can improve the speed of recovery of marker detection by the image analyser and so either avoid entering failsafe mode or improve the speed with which the PED can move out of failsafe mode and re-couple the graphics object to the marker and restore its normal characteristics.

In a second instance this may be used to predict the point of re-entry of a marker into the captured video images to similarly modify parameters of the image analyser to increase detection sensitivity or lower a rejection threshold in order to expedite re-acquisition of the marker.

In a third instance, even when the image analyser is properly finding the marker, motion tracking may be used to predict where the marker is likely to be in the next captured image frame, and in conjunction with the estimated size of the marker in the previous image frame can be used to define an analysis window in the captured image. This analysis window may be analysed first to detect the marker, with the full captured image only being analysed if the marker is not detected within the window. This can reduce the computational load on the image analyser and hence the CPU.

Thus more generally, the image analyser can either enhance sensitivity or limit analysis to a region, responsive to the location of the marker predicted by the motion detector.

Figure 5:
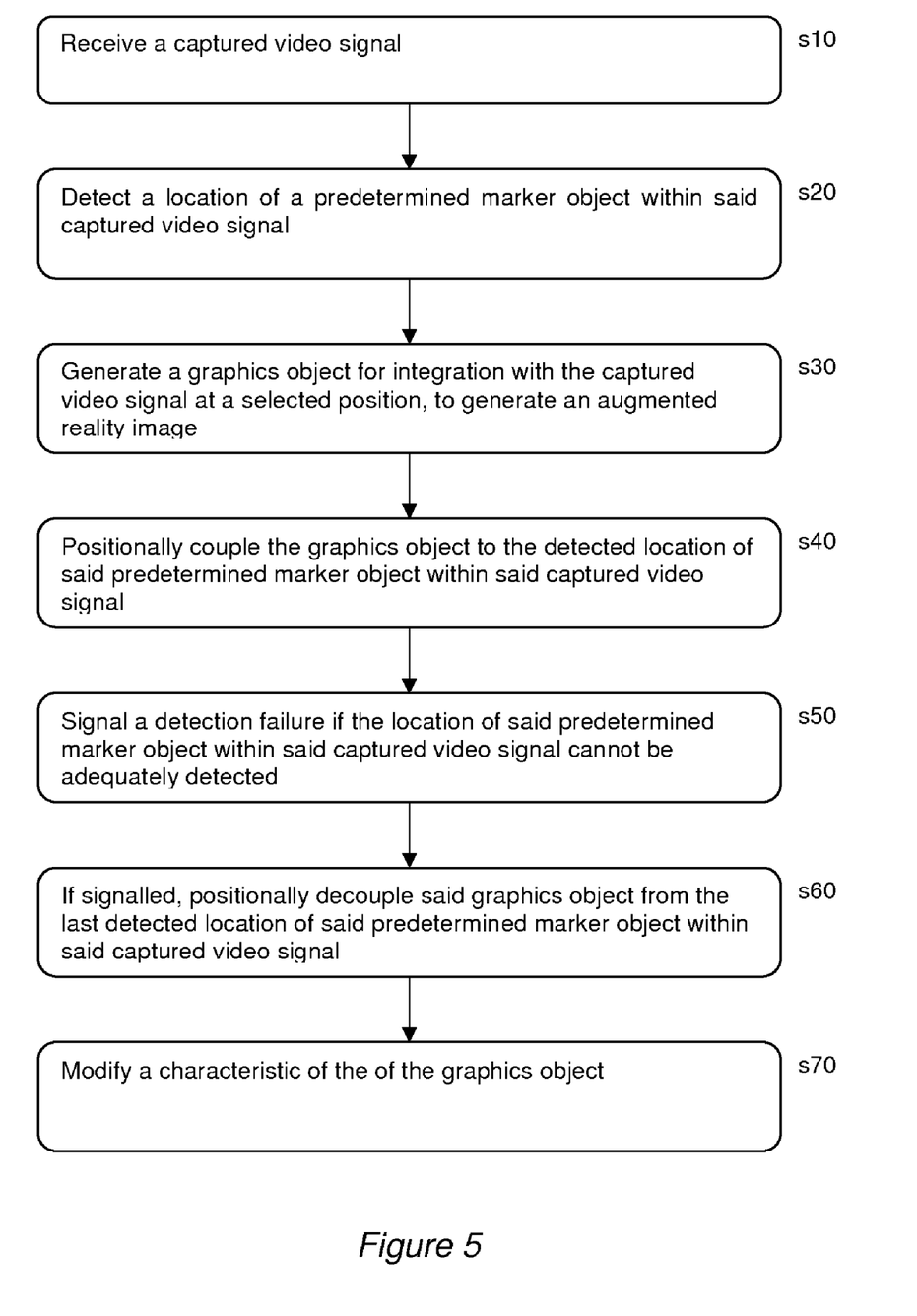
FIG. 5 is a flow diagram of a failsafe method according to an embodiment of the present invention.

Referring now to FIG. 5, a failsafe method comprises:

In a first step s10, receiving a captured video signal;

In a second step s20, detecting a location of a predetermined marker object within said captured video signal;

In a third step s30, generating a graphics object for integration with the captured video signal at a selected position, to generate an augmented reality image;

In a fourth step s40, positionally coupling the graphics object to the detected location of said predetermined marker object within said captured video signal;

In a fifth step s50, signalling a detection failure if the location of said predetermined marker object within said captured video signal cannot be adequately detected;

and if so signalled,

In a sixth step s60, positionally decoupling said graphics object from the last detected location of said predetermined marker object within said captured video signal; and In a seventh step s70, modifying a characteristic of the of the graphics object.

It will be appreciated that the order of the above steps may vary upon implementation; for example steps 6 and 7 may occur in an opposite order or substantially in parallel. Similarly step 5 may precede step 3, and if a failure is detected then optionally step 3 may be deferred until after step 7. Hence any suitable order of operation is envisaged.

It will be apparent to a person skilled in the art that variations in the above method corresponding to operation of the various embodiments of the apparatus as described and claimed herein are considered within the scope of the present invention, including but not limited to:

the steps of positionally decoupling said graphics object and modifying a characteristic of the of the graphics object being conditional upon a detection failure being signalled for a predetermined threshold period;

the steps of positionally decoupling said graphics object and modifying a characteristic of the of the graphics object being conditional upon detecting motion of the entertainment device in the plane of the captured video signal that exceeds a predetermined threshold;

the predetermined threshold representing a motion sufficient to move said predetermined marker object from its last detected location to a location with respect to said captured video signal where detection of the location of said predetermined marker object is no longer possible;

predicting the location of said predetermined marker object in said captured video signal based upon detected motion of the entertainment device;

enhancing detection sensitivity in a region responsive to the location of said predetermined marker object predicted by said detected motion of the entertainment device; and the step of detecting a location of a predetermined marker object being limited to a region of the video signal image responsive to the location of the predetermined marker object predicted by said detected motion of the entertainment device.

Finally, it will be appreciated that the methods disclosed herein may be carried out on conventional hardware suitably adapted as applicable by software instruction and/or by the inclusion or substitution of dedicated hardware.

Thus the required adaptation to existing parts of a conventional equivalent device may be implemented in the form of a computer program product or similar object of manufacture comprising processor implementable instructions stored on a non-transitory data carrier such as a floppy disk, optical disk, hard disk, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device.

I claim:

1. An entertainment device for generating augmented reality environments, comprising:

an input for a captured video signal;

an image analyser arranged to detect a location of a predetermined marker object within said captured video signal;

a graphics generator arranged to generate a graphics object for integration with the captured video signal at a selected position, to generate an augmented reality image;

a controller arranged to positionally couple the graphics object to the detected location of said predetermined marker object within said captured video signal; and a detection failure logic arranged to signal when the image analyser cannot detect the location of said predetermined marker object within said captured video signal;

and in which if the detection failure logic signals that the image analyser cannot adequately detect the location of said predetermined marker object within said captured video signal, then the controller is arranged to positionally decouple said graphics object from a last detected location of said predetermined marker object within said captured video signal; and the controller is arranged to instruct the graphics generator to modify a characteristic of the of the graphics object.

2. An entertainment device according to claim 1, in which the controller is arranged to positionally decouple said graphics object from the last detected location of said predetermined marker object after a predetermined threshold period.

3. An entertainment device according to claim 1, comprising a motion detector;

and in which the controller is arranged to only positionally decouple said graphics object and instruct the graphics generator to modify a characteristic of the graphics object if in conjunction with a failure signal from the detection failure logic, the motion detector detects motion in the plane of the captured video signal exceeding a predetermined threshold.

4. An entertainment device according to claim 3, in which the motion detector comprises an accelerometer.

5. An entertainment device according to claim 3, in which the motion detector comprises an optical flow detector.

6. An entertainment device according to claim 3, in which said predetermined threshold represents a motion sufficient to move said predetermined marker object from its last detected location to a location with respect to said captured video signal where said image analyser is incapable of detecting the location of said predetermined marker object.

7. An entertainment device according to claim 3, in which the motion detector is operable to predict the location of said predetermined marker object in said captured video signal.

8. An entertainment device according to claim 7, in which the image analyser is operable to enhance detection sensitivity in a region responsive to the location of the predetermined marker object predicted by the motion detector.

9. An entertainment device according to claim 7, in which the image analyser is operable to limit detection to a region responsive to the location of the predetermined marker object predicted by the motion detector.

10. A failsafe method for an entertainment device, comprising the steps of:

receiving a captured video signal;

detecting a location of a predetermined marker object within said captured video signal;

generating a graphics object for integration with the captured video signal at a selected position, to generate an augmented reality image;

positionally coupling the graphics object to the detected location of said predetermined marker object within said captured video signal;

signalling a detection failure if the location of said predetermined marker object within said captured video signal cannot be adequately detected;

and if so signalled, positionally decoupling said graphics object from a last detected location of said predetermined marker object within said captured video signal; and modifying a characteristic of the of the graphics object.

11. A method according to claim 10, in which the steps of positionally decoupling said graphics object and modifying a characteristic of the of the graphics object are conditional upon a detection failure being signalled for a predetermined threshold period.

12. A method according to claim 10, in which the steps of positionally decoupling said graphics object and modifying a characteristic of the of the graphics object are conditional upon detecting motion of the entertainment device in the plane of the captured video signal that exceeds a predetermined threshold.

13. A method according to claim 10, in which said predetermined threshold represents a motion sufficient to move said predetermined marker object from its last detected location to a location with respect to said captured video signal where detection of the location of said predetermined marker object is no longer possible.

14. A method according to claim 10, comprising the step of predicting the location of said predetermined marker object in said captured video signal based upon detected motion of the entertainment device.

15. A method according to claim 14, comprising the step of enhancing detection sensitivity in a region responsive to the location of said predetermined marker object predicted by said detected motion of the entertainment device.

16. A method according to claim 14, in which the step of detecting a location of a predetermined marker object is limited to a region of the video signal image responsive to the location of the predetermined marker object predicted by said detected motion of the entertainment device.

17. A non-transitory storage medium comprising a computer program product on which computer readable instructions of a computer program are stored, the instructions, when executed by a processor, cause the processor to perform a failsafe method for an entertainment device, the method comprising:

receiving a captured video signal;

detecting a location of a predetermined marker object within said captured video signal;

generating a graphics object for integration with the captured video signal at a selected position, to generate an augmented reality image;

positionally coupling the graphics object to the detected location of said predetermined marker object within said captured video signal;

signalling a detection failure if the location of said predetermined marker object within said captured video signal cannot be adequately detected;

and if so signalled, positionally decoupling said graphics object from a last detected location of said predetermined marker object within said captured video signal; and modifying a characteristic of the of the graphics object.

* * * * *